United States Patent
Rapp et al.

(10) Patent No.: US 6,946,765 B2
(45) Date of Patent: Sep. 20, 2005

(54) ROTOR UNIT FOR AN ELECTROMOTOR AND AN INTERNAL ROTOR ELECTROMOTOR

(75) Inventors: Harald Rapp, Eschbronn (DE); Oswald Kuwert, Tutschfelden (DE); Jurgen Oelsch, Hohenroth (DE)

(73) Assignee: Minebea Co., Ltd., Nagano (JP)

(*) Notice: Subject to any disclaimer, the term of this patent is extended or adjusted under 35 U.S.C. 154(b) by 0 days.

(21) Appl. No.: 10/413,883

(22) Filed: Apr. 15, 2003

(65) Prior Publication Data

US 2003/0222525 A1 Dec. 4, 2003

Related U.S. Application Data

(63) Continuation of application No. PCT/EP01/10457, filed on Sep. 10, 2001.

(30) Foreign Application Priority Data

Oct. 17, 2000 (DE) .......................... 100 51 403

(51) Int. Cl.$^7$ ................................. H02K 5/16
(52) U.S. Cl. ........................ 310/90; 310/91; 310/43; 310/86
(58) Field of Search ............................ 310/43, 89, 86, 310/90, 87, 91

(56) References Cited

U.S. PATENT DOCUMENTS

| | | | | |
|---|---|---|---|---|
| 3,229,130 A | * | 1/1966 | Drouard | 310/89 |
| 3,487,457 A | * | 12/1969 | Drouard et al. | 310/86 |
| 3,733,504 A | * | 5/1973 | Dennis | 310/90 |
| 4,048,530 A | * | 9/1977 | Kaufman, Jr. | 310/89 |
| 4,118,644 A | * | 10/1978 | Schulte et al. | 310/89 |
| 4,999,533 A | | 3/1991 | King et al. | |
| 5,065,061 A | * | 11/1991 | Satoh et al. | 310/90 |
| 5,767,606 A | * | 6/1998 | Bresolin | 310/43 |
| 5,945,759 A | * | 8/1999 | Tanaka et al. | 310/90 |
| 5,970,600 A | | 10/1999 | Huang et al. | |
| 6,075,301 A | * | 6/2000 | Shinoda | 310/89 |
| 6,274,955 B1 | * | 8/2001 | Satoh et al. | 310/71 |
| 6,294,850 B1 | * | 9/2001 | Yui et al. | 310/40 MM |
| 6,365,995 B1 | * | 4/2002 | Fukuda et al. | 310/156.38 |

FOREIGN PATENT DOCUMENTS

| | | | |
|---|---|---|---|
| DE | 3818532 A1 | 5/1988 | |
| DE | 41 29 590 C3 | 9/1991 | |
| DE | 44 34 448 A1 | 9/1994 | |
| DE | 44 38 132 A1 | 10/1994 | |
| DE | 199 07 555 A1 | 2/1999 | |
| DE | EP 0 963 029 A3 | 12/1999 | |
| DE | P30008PCT L | 9/2001 | |
| DE | 100 34 302 A1 | 2/2002 | |
| JP | 05344704 A | * 12/1993 | H02K/37/14 |
| WO | WO 02/33804 A1 | 4/2002 | |

OTHER PUBLICATIONS

Adolf Lindner, *An Electrical Motor* Application No. 45660/70 Filed Sep. 24, 1970, Complete Specification published Sep. 19, 1973.

* cited by examiner

*Primary Examiner*—Karl Tamai
*Assistant Examiner*—Yahveh Comas
(74) *Attorney, Agent, or Firm*—Joel Lutzker; Anna Vishev; Schulte Roth & Zabel LLP

(57) ABSTRACT

A rotor assembly for an electric motor having a rotor shaft and at least one permanent magnet arranged on the rotor shaft. The rotor shaft with the permanent magnet is accommodated in a sleeve the rotor shaft being freely rotatable within the sleeve. The sleeve is closed off by a flange at a first end face. An inner-rotor electric motor having a stator and a rotor assembly of the type described above, with the stator being inserted over the sleeve of the rotor assembly.

17 Claims, 4 Drawing Sheets

ROTOR UNIT FOR AN ELECTROMOTOR AND AN INTERNAL ROTOR ELECTROMOTOR

CROSS REFERENCE TO RELATED APPLICATIONS

This application is a continuation of PCT application serial No. PCT/EP01/10457, filed Sep. 10, 2001 (pending) and claims all rights of priority thereto, the PCT Application in turn claimed priority to German Patent Application Serial No. DE 10051403.0, filed Oct. 17, 2000 (pending).

BACKGROUND

The invention relates to a rotor assembly for an electric motor comprising a rotor shaft and at least one permanent magnet arranged on the rotor shaft, as well as an inner-rotor electric motor in which such a rotor assembly is employed.

The invention relates to the area of brushless electric motors with permanent magnets and more particularly to d.c. motors configured as so-called inner-rotor electric motors. Inner-rotor electric motors comprise a rotor assembly including a rotor shaft and one or more permanent magnets arranged on the rotor shaft. The rotor shaft is inserted into a stator unit comprising a stator body and field windings.

The construction of such a motor is described, for example, in U.S. Pat. No. 5,970,600. The motor comprises a casing containing the stator, the rotor assembly as well as bearings to rotatably support the rotor assembly. The stator includes stator plates and windings and defines an inner space into which the rotor assembly can be inserted. As disclosed in the '600 patent, the bearings for the rotor assembly may be integrated into end caps of the motor casing yielding an overall compact construction.

A problem arises in the process of manufacturing of such an inner-rotor electric motor in that ferromagnetic particles are carried away from the rotor magnets when the rotor assembly is inserted into the interior space of the stator. These particles may reach the working gap defined essentially by the outer contour of the rotor magnet and the inner contour of the stator. It is in fact possible and common to protect the entire motor assembly against the penetration of foreign bodies and contaminants after assemblage by providing a casing as described in the '600 patent. However, during assemblage of different motor components, the inside of the motor and, more particularly, the working gap are not protected against the entry of such foreign bodies.

Moreover, inner-rotor electric motors according to the prior art require a complicated assembly process which is predominantly sequential, comprising a sequential pre-assemblage of the stator and of at least one bearing in the casing and a subsequent fitting of the rotor assembly into the stator and into the bearing. The concentricity of the parts that is required for the inner-rotor electric motor can only be attained by providing a lid-type flange containing the second bearing rotatably supporting the rotor shaft. This assemblage step is considerably complicated by the magnetic forces and moments issuing from the rotor magnet. These forces arise from the interaction of rotor magnets with the stack of stator plates and are directed radially and axially. As a result of this interaction, a contact-free concentric fitting of the rotor is either not possible at all, or is possible only with the deployment of considerable technical means.

German Patent No. 32 37 196 discloses a miniature synchronous motor which has a one-part cup-shaped casing surrounding the ironless field windings as a ferromagnetically active flux guide, and which further has a rotor arranged inside the field windings. The permanent magnets of this rotor are arranged on a sleeve of magnetically conducting material. The rotor is housed in an hermetically sealed casing containing the bearings. Torque output occurs via a permanent magnet coupling comprising a first element constituted by the permanent magnets of the rotor and a second element consisting of a permanent magnet array on a shaft outside the rotor case. By hermetically enclosing the rotor, it is guaranteed that foreign bodies cannot penetrate to the rotor and the bearings are permanently lubricated and protected against environmental impacts. Assemblage of the motor as a whole occurs by inserting the hermetically enclosed rotor into the cylindrical hollow space of a cup-shaped plastic shell open on one side and having embedded ironless field windings. The shell is held within a casing of ferromagnetic material that is also cup-shaped.

Relative to the '600 patent described above, the patent document DE 32 37 196 represents an improvement insofar as the motor assembly is simplified, while the shearing off of ferromagnetic particles from the rotor assembly occurring in the prior described assemblage is eliminated because field windings are ironless and are fully embedded into plastic material.

However, motors having ironless field windings, in accordance with the arrangement disclosed in DE 32 37 196, have a disadvantage of functioning with very low efficiency due to the large gap. Therefore, the disclosed construction is predominantly used in high-speed micromotors, typically for dental applications. They are entirely inappropriate for the delivery of larger torques such as required for instance in motor vehicle applications.

The inner-rotor motor of DE 32 37 196 has the further disadvantage in that a direct mechanical coupling of a load is not possible because of the hermetic enclosing of the rotor assembly. Therefore, the torque transfer from the rotor to a shaft can occur only indirectly, for instance by magnetic coupling, as described in the patent document.

It is a common practice in the field of pump motors to provide a gap tube or gap can for separating the stator and rotor so as to isolate the stand and the pump electronics from the side of the pump motor containing the conveyed medium. Such canned motors are described for instance in DE 38 18 582, EP 0 963 029, DE 199 07 555, and DE 44 34 448. All of these documents concern synchronous or asynchronous machines, wherein an essential feature of a disclosed canned motor is a gap can completely closed on one side.

U.S. Pat. No. 4,999,533 describes an electric motor with an enclosed rotor unit to be used, for example, in a blower. The rotor is enclosed by a sleeve having ribs engaging with the stator in order to support the stator relative to the rotor in a motor without frame.

The GB-A-1,330,674 also describes a rotor with a rotor assembly accommodated in a sleeve, the sleeve having stiffening ribs extending on its outside in a longitudinal direction.

In an older patent application of the same applicant, DE 100 34 302.3, a rotor assembly for an electric motor is described. The motor comprises a rotor shaft and at least one permanent magnet arranged on the rotor shaft. The rotor shaft with the permanent magnet are housed for support in a sleeve, the rotor shaft being freely rotatable within the sleeve.

The rotor assembly can be pre-assembled within the sleeve and is preferably designed such that the rotor shaft protrudes from the sleeve on one end of the sleeve. The sealing between the sleeve body and the rotor shaft is provided in bearings at the end faces of the sleeve rotatably supporting the rotor shaft. This arrangement does not result in hermetic sealing of the rotor assembly, however, with the bearings at the end faces of the sleeve being additionally protected by seals against the entry of contaminants, the sleeve is sufficiently protected against the penetration of foreign particles.

The rotor as a whole is inserted into the inside of the stator as a pre-assembled assembly, hence problems associated with a shearing off of ferromagnetic particles does not arise.

The rotor assembly that is enclosed by the plastic sleeve is self-centered in an axial direction by the magnetic forces acting between the rotor assembly and the stator when it is inserted into the stator. Thus, further precautions such as providing and adjusting stops for a correct positioning of the rotor in the stator need not be taken. Attention must merely be given to a sufficiently high free mobility of the rotor assembly within the stator, so that a stop, a closed end of the stator or the like does not prevent it from being magnetically centered inside the stator.

With such a rotor assembly, a distinct improvement over the prior art is achieved in that an inner-rotor electric motor can be assembled with little effort. It is also guaranteed that during assemblage and operation, no contaminants reach the inside of the motor or, more particularly, the working gap. However, these advantages result from utilizing additional parts, particularly the "lost" sleeve, which necessarily increases the manufacturing cost.

SUMMARY OF THE INVENTION

It is an object of the present invention to provide a rotor assembly and an inner-rotor electric motor that are easy to assemble and will be realized with a smallest possible number of parts.

The invention provides a rotor assembly for an electric motor that comprises a rotor shaft and at least one permanent magnet arranged on the rotor shaft. The rotor shaft with the permanent magnet supported thereon is housed in a sleeve, the rotor shaft being freely rotatable within the sleeve. The sleeve is connected with a flange at a first end face. The connection between the sleeve and the flange is preferably such that the flange terminates the sleeve at its first end face. This leads to the advantage that a small number of parts is required for the assembly. Additionally, assemblage of the entire electric motor is simplified, inasmuch as a motor flange such as required for installation of the electric motor or for fixing a motor casing at it, is used as an integral part of the sleeve for enclosing the rotor assembly, thus performing a two-fold function. Optionally, the sleeve may have a reinforcing structure at its outer perimeter.

The flange is formed in such a way that it contains one bearing supporting the rotor shaft at the first end face of the sleeve and a bearing seat for the second bearing supporting the rotor shaft being integrated into the sleeve at a second end face of the sleeve, the second end face being opposite to the first end face. The rotor shaft protrudes beyond the sleeve from the flange at the first end face of the sleeve.

In a preferred embodiment, the sleeve has an essentially cylindrical encapsulating segment while the flange is molded onto the sleeve or can be engaged with it as a separate part. In the former instance, the flange is formed so that it has a lid portion, closing off the sleeve at a first end face and receiving a bearing for the rotor shaft, and a flange portion, radially extending outwards for installing the electric motor. The lid portion and the flange portion can be formed as a one- or two-part element. Where the flange is engaged with the sleeve as a separate part, the flange comprises a similar lid portion and a casing portion that is connected with the lid portion and encloses the electric motor. The above two constructions may be utilized in combination.

In an embodiment particularly advantageous from the manufacturing point of view, the casing portion is made of deep-drawn sheet. The sheet is placed into an injection-molding machine and is partly covered with molding plastic material forming the lid portion and providing the connection to the casing portion.

The invention further provides an inner-rotor electric motor with a rotor assembly of the type described above, and with a stator, wherein the stator is inserted over the sleeve of the rotor assembly or between the sleeve and the casing portion of the rotor assembly. This electric motor may in addition be encapsulated in part or in full.

The invention provides a rotor assembly for an electric motor and an inner-rotor electric motor wherein the rotor together with the bearings is preassembled in a combination of a sleeve and a flange terminating the sleeve, and this rotor assembly is inserted into the stator. The flange on one hand terminates the rotor assembly protecting it against contamination by foreign particles, and on the other hand serves as an installation base for the finished electric motor and/or fitting of a motor casing to the motor. The rotor shaft protrudes from the sleeve at the flange. The rotor assembly is adequately protected by the provided flange together with the bearing and its sealing. The construction according to the invention provides a highly compact, protected electric motor that can be preassembled with a minimum number of parts and assemblage steps, in a clean room for instance, and can then be inserted as a whole into the stator. By providing the sleeve, ferromagnetic material can be prevented from being sheared off during insertion of the rotor assembly into the stator and from penetrating into the working gap. An entry of other foreign particles is also prevented by the encapsulated rotor assembly. Encapsulating the rotor assembly by a sleeve, preferably made of plastic material, further causes the rotor to become self-centered in an axial direction when being inserted into the stator, and prevents structure-borne sound from being propagated from the rotor to the stator or, when present, to a motor casing.

The motor according to the invention can be used for instance as a d.c. motor in motor vehicle applications, such as a steering aid, driving hydraulic systems, because the provided motor builds up a hydraulic pressure when it is actually needed in the motor vehicle, or braking systems actuated by electric motors (so-called break-by-wire systems).

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DESCRIPTION OF THE PREFERRED EMBODIMENTS

Figure 1:
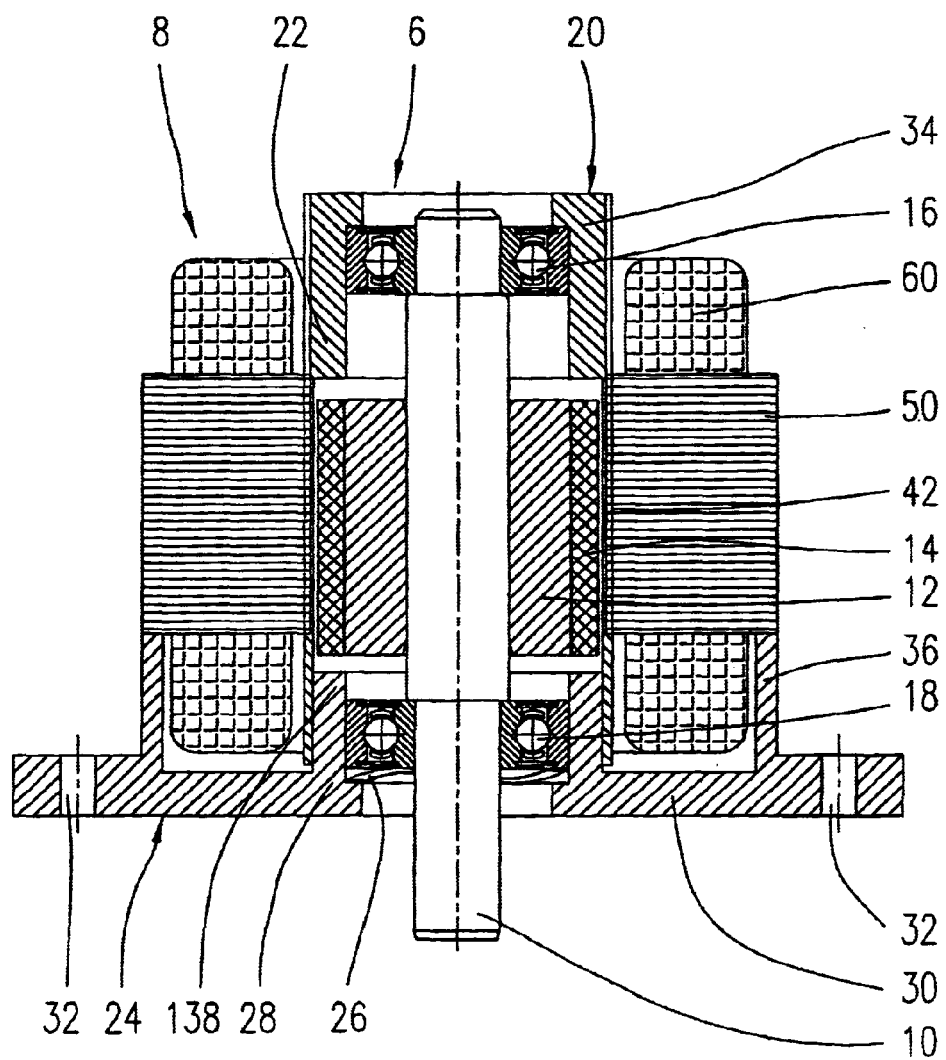
FIG. 1 is a cross-sectional view of an inner-rotor electric motor according to a first embodiment of the invention.

FIG. 1 shows a first embodiment of an inner-rotor electric d.c. motor, according to the invention, in a sectional view. The motor comprises a rotor assembly 6 and a stator 8. The rotor assembly has a rotor shaft 10 supporting a back iron ring 12 made of a soft magnetic material such as iron. A segmented or annular permanent magnet 14 is attached to the back iron ring 12. The shaft 10 is supported for rotation in bearings 16, 18 formed as roller bearings or friction bearings, and more particularly as ball bearings. The rotor, consisting of the rotor shaft 10, the back iron ring 12, and permanent magnet(s) 14, is enclosed within a sleeve 20 comprising a cup portion 22 and a flange 24.

In the embodiment shown in FIG. 1, the one-piece flange 24 comprises a central lid portion 28, with a bearing mounting member 138 extending towards the interior of the rotor assembly, and a flange portion 30. The flange portion 30 has holes 32 distributed over the periphery of the motor. In the embodiment shown, the cup portion 22 of sleeve 20 is placed over the lid portion 28 of the flange 24 in order to provide an exact fitting connection between the two parts.

Bearings 16, 18 can be preassembled on the rotor shaft 10. One of the two bearings (16) is placed at an end face 34 of the cup portion 22 of sleeve 20. The other bearing (18) is placed into the bearing mounting member 138 of the lid portion 28 of flange 24. Bearings are held by press-fitting and/or glueing, or in another suitable manner. In the embodiment shown, an annular spring element, for instance an ondular washer 26, is provided in the lid portion 28 of flange 24 adjacent to bearing 18 to equalize the combined axial play and brace the two bearings 16, 18 relative to each other without play.

The rotor assembly is shown in FIG. 1 with its basic elements, the specific dimensions and detailed arrangement of the elements being subject to variation. More particularly, ball bearings 16, 18 are shown in FIG. 1 but the rotor can be rotatably supported in any other suitable fashion, for instance with friction bearings, hydraulic bearings, air bearings, etc. The rotor assembly may also contain elements other than those represented. An air gap is provided between the outer periphery of the permanent magnet(s) 14 and the inside of sleeve 20. The air gap allows for a relative motion between the stationary sleeve and the rotating rotor and should be as small as possible. Depending on particular requirements to the rotor assembly and the electric motor, many other variants of the embodiment shown will become apparent to those skilled in the art.

The cup portion 22 of sleeve 20 is preferably made of plastic material by injection molding. Departing from the embodiment shown, the cup portion 22 may have a separate lid made of plastic or metal at the end face 34 opposite to flange 24. This is shown, for instance, in the embodiment of FIG. 4 described below. A plastic material particularly well suited is LCP (liquid crystal polymer). Other materials are polyacetal, polyoxymethylene (POM), polysulfone (PSU), polylcarbonate (PC), polyphenylene sulfide (PPS), polyamideimide (PAi), polyether ether ketone (PEEK), polyether sulfone (PES), and polyether imide (PEi). The one-part flange 24 of the embodiment shown is made of metal.

The cup portion 22 shown in FIG. 1 has a relatively thin inner wall with longitudinal ribs formed on its outer face for stiffening the sleeve wall. The stiffening structure corresponds to the invention described in DE 00 34 302.3 to which reference is made. The longitudinal ribs extend over essentially the full length of the cylindrical sleeve 20, and are parallel to its longitudinal axis, with the number and detailed design of the ribs being adapted to the inner contour of the stator.

The rotor assembly 6 shown in FIG. 1 is inserted into the interior of stator 8. In FIG. 1, the stator 8 is schematically represented as a stack of sheets built up of individual stator sheets 50 and a winding 60. A dashed line 42 indicates penetration of the longitudinal ribs into the pole gaps formed between the stator poles.

In the embodiment shown, metal flange 24 is formed in such a way that the bearing mounting member 138 of the lid portion 28 extends into the cup portion 22 of the sleeve and can be glued to it terminating the sleeve 20. The flange portion 24, extending radially outwardly from the lid portion 28, is used to attach the assembled motor on location, for instance to the chassis of a motor vehicle or the like. The flange portion 24 has a wall portion 36 partly surrounding stator 8 when the motor has been assembled. Departing from the embodiment shown in FIG. 1, the wall portion 36 projecting from the flange 24 can extend over the entire length, or over essentially the entire length, of stator 8, thus forming a casing body for the assembled electric motor.

Figure 2:
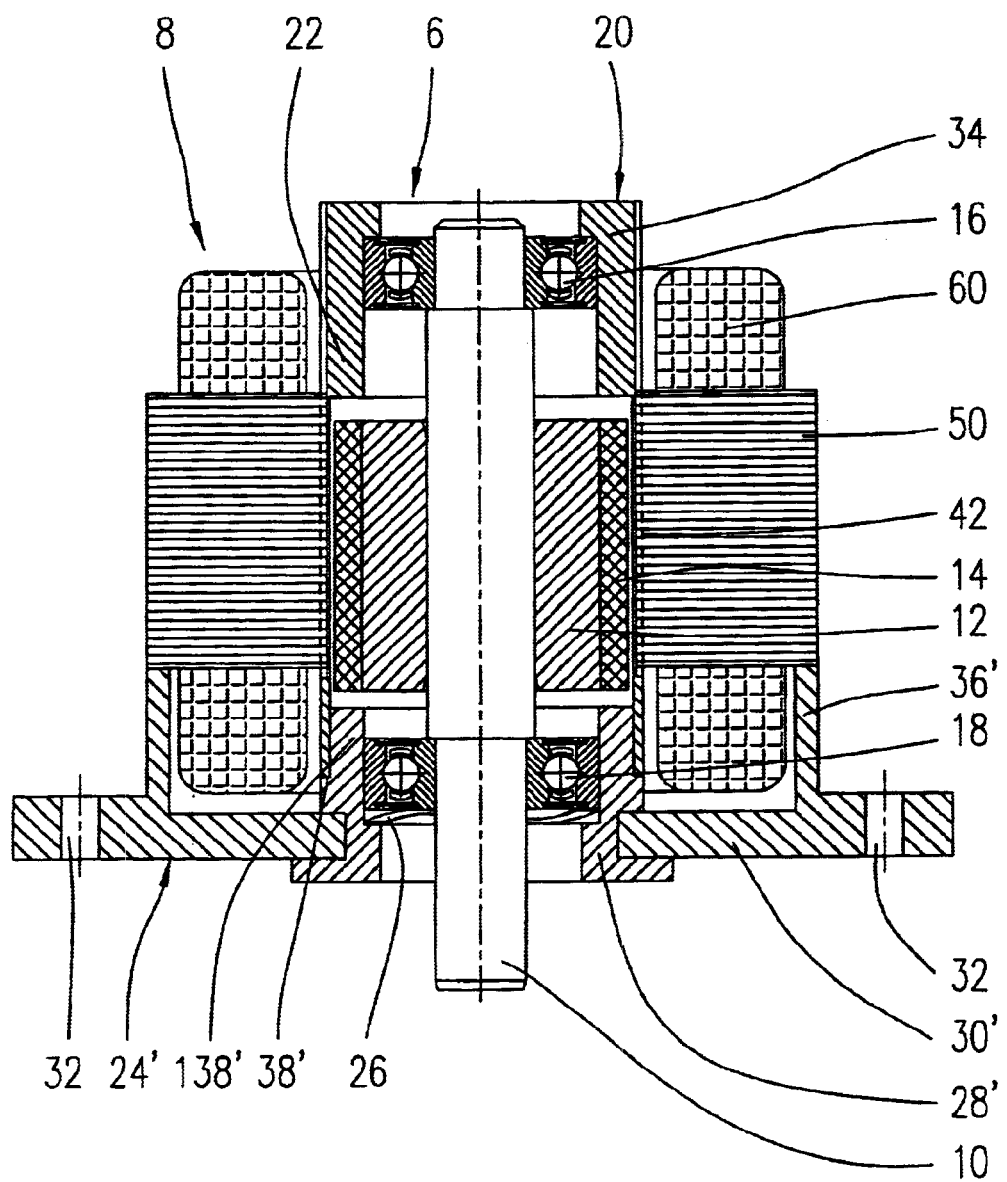
FIG. 2 is a cross-sectional view of an inner-rotor electric motor according to a second embodiment of the invention.

FIG. 2 shows another embodiment of the inner-rotor electric motor according to the invention differing from FIG. 1 in the shape of the flange. The same or similar parts as in FIG. 1 bear the same reference symbols and are not again described.

Flange 24' of this second embodiment differs from flange 24 of the first embodiment, in that it is made of two parts. In flange 24', a lid portion 28', with its bearing mounting member 138' extending towards the interior of the rotor assembly, and a flange portion 30' are made separately of different materials. The lid portion 28' is preferably made of plastic material and the flange portion 30' is preferably made of metal. More particularly, the plastic lid portion 28' is injected into the flange portion 30' and contains a pocket for the bearing 18. Additionally, the lid portion 28' has a shoulder 38' stopping the cup portion 22 of sleeve 20 when the sleeve 20 is slid over the bearing mounting member of the lid portion 28' of flange 24'.

The embodiment shown in FIG. 2 has the advantage that the two bearings 16 and 18 are received in plastic parts, i.e., the sleeve 20 and the lid portion 28' constituting parts separate from the flange portion 30' and serving to attach the motor to a chassis or the like, so that the propagation of structure-borne sound to the chassis can be drastically reduced.

At a first glance, the embodiment of FIG. 2 may appear as having more requirements, but it has the manufacturing advantage because in manufacturing, the lid portion 28' can be more easily formed by injection molding than in the one-part metal flange 24 of FIG. 1.

Figure 3:
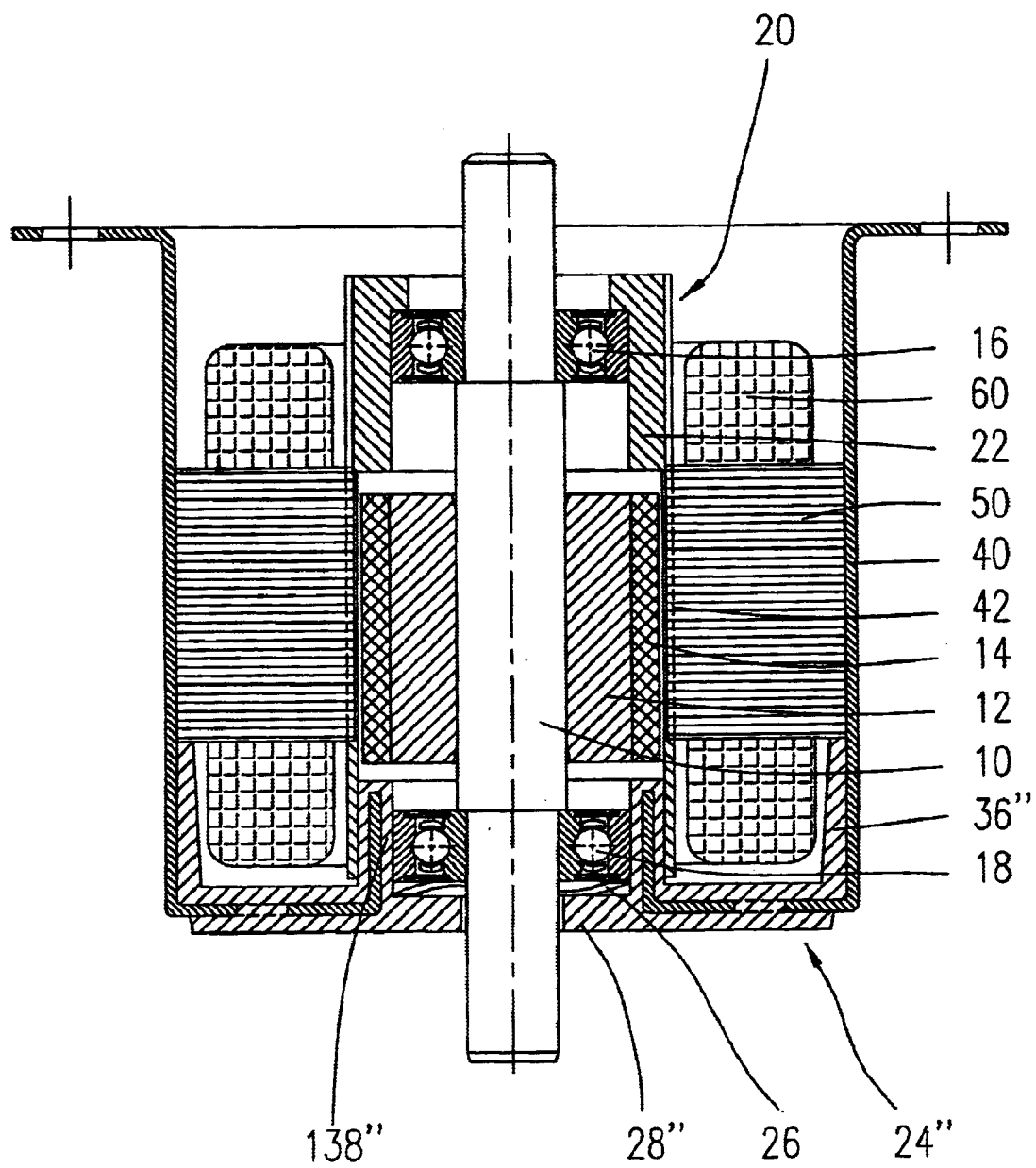
FIG. 3 is a cross-sectional view of an inner-rotor electric motor according to a third embodiment of the invention.
Figure 4:
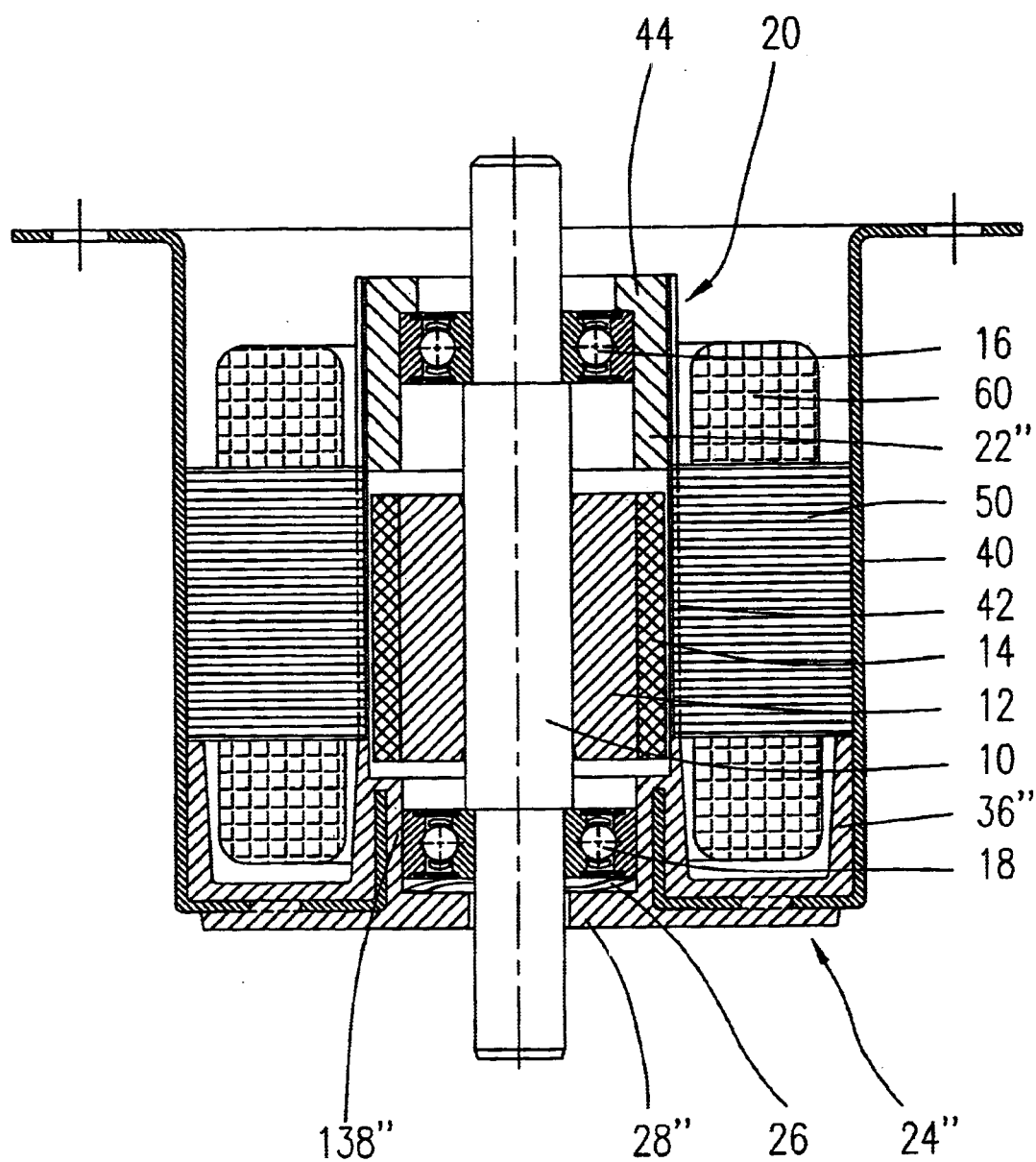
FIG. 4 is a cross-sectional view of an inner-rotor electric motor according to a fourth embodiment of the invention.

Further embodiments of the invention are shown in FIGS. 3 and 4. In FIGS. 3 and 4, too, the same or similar parts as in preceding figures are designated with the same reference symbols, and not again described.

FIGS. 3 and 4 differ from the preceding embodiments in that flange 24" has a plastic lid portion 28", with its bearing mounting member 138" extending towards the interior of the rotor assembly, and a casing cover 40 connected therewith.

The casing cover 40 preferably consists of a deep-drawn metal sheet part coated with and held by the plastic material of lid portion 28". This cup-shaped casing cover 40 is placed to surround the entire electric motor after the stator 8 and rotor assembly 6 are joined together.

The embodiments of FIGS. 3 and 4 differ in the design of the sleeve's cup portion 22. FIG. 3 shows the cup portion 22 of sleeve 20 as a part that is separate from the lid portion 28" of flange 24", as in the two preceding embodiments, while FIG. 4 shows the design of the cup portion 22" of sleeve 20 constituting an integral unit together with the lid portion 28" of flange 24". In the embodiment of FIG. 4, sleeve 20 has a separate lid portion 44 at its end face opposite to flange 24" that can be taken off in order to enable insertion of the rotor into the sleeve 20.

In the two embodiments shown in FIGS. 3 and 4, the casing cover 40 is placed into an injection molding machine and partly covered with the plastic material forming the lid portion 28" of flange 24" and providing the connection to the casing cover 40. A wall portion 36" is provided in this embodiment on flange 24" to stabilize the casing cover 40 and to serve as a stop for the stator.

In addition, and similarly to the embodiments shown in FIGS. 1 and 2, in these embodiments flange 24" can be designed to be used to mount the assembled electric motor on a chassis or the like. However, this is not shown in the figures.

The inner-rotor electric motor according to the embodiments of the invention can be manufactured in a simple fashion, by first preassembling the rotor assembly, preferably in a clean room. To this end the back iron 12 and the permanent magnet(s) 14 are attached to the rotor shaft 10, and bearings 16, 18 are preassembled on rotor shaft 10. Sleeve 20 and flange 24 are inserted over the rotor from opposite ends of shaft 10, connected with each other, and preferably glued together. Bearings 16, 18 of the rotor 6 at this point are solidly held in the end face 34 of sleeve 22 and in the lid portion 28 of flange 24, respectively. Bearings are braced by the ondular washer 26.

For a durable attachment to the stator, a preferably liquid plastic material can be applied to the outside of sleeve 20 before the fully preassembled rotor assembly is inserted into the interior of stator 8 (where it is freely movable in an axial direction), and aligned in the magnetic center by "self-centering magnetic forces".

In the embodiment shown, stator ring 8 is open at its two ends so as not to hinder the axial movement of the rotor assembly 6. Other stator designs will be apparent to those skilled in the art, the great advantage of the invention being that stops or other means to center the rotor 6 in the stator 8 can be omitted.

After insertion of the rotor assembly 6 into the stator 8, the glue fills the gaps that still remain at least in part, and after setting guarantees a firm, immovable hold of rotor 6 in stator 8. The propagation of structure-borne sound, and thus sound projection of the entire motor, is drastically reduced by the complete encapsulation of rotor 6 and by enclosing all moving rotating parts in a sleeve that is stationary relative to the stator 8 and to the motor casing.

The inner-rotor motor constructed in the way described above can be plastic-coated or resin-embedded as a whole without any detrimental effect on its function, and mounted via the flange 24 at the predetermined place in or at an associated assembly block.

A specific adjustment of stator 8 to the rotor assembly according to the invention is not required. Junctions between individual components such as shaft 10, back iron 12, and permanent magnet 14 or sleeve 20 and flange 24, bearings 16, 18 or stator 8 can be accomplished by compression, gluing, welding, snapping or in any other suitable way. Numerous further variants and modifications of the invention will become apparent to those skilled in the art.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A rotor assembly for a brushless d.c. motor, comprising:
   a rotor shaft having at least one permanent magnet mounted thereon;
   a sleeve accommodating said rotor shaft with said permanent magnet therewithin for a free rotation of said rotor shaft, said sleeve being open at both ends;
   a first bearing supporting said shaft;
   a second bearing supporting said shaft; and
   a flange, said flange further comprising a bearing mounting member extending towards the interior of said rotor assembly and connecting said flange to said sleeve at a first end face of said sleeve by sliding said first end of said sleeve over said bearing mounting member,
   wherein said first bearing is integrated into said bearing mounting member at said first end face of said sleeve such that said first bearing is not placed into contact with said sleeve, wherein said second bearing is integrated into said sleeve at a second end face of said sleeve such that said second bearing is placed into an immediate contact with said sleeve, and wherein said first and second end faces of said sleeve are enclosed by said flange and said first and second bearings.

2. The rotor assembly according to claim 1, wherein said sleeve further comprises a stiffening structure on its outside.

3. The rotor assembly according to claim 1, wherein said rotor shaft protrudes from said sleeve at said first end face at said flange.

4. The rotor assembly according to claim 1, wherein said sleeve is molded onto said bearing mounting member.

5. The rotor assembly according to claim 1, wherein said sleeve further comprises an essentially cylindrical cup portion engageable with said bearing mounting member.

6. The rotor assembly according to claim 1, wherein said bearing mounting member further comprises a lid portion terminating said sleeve at said first end face and enclosing said first bearing and wherein said flange further comprises a flange portion projecting radially outwardly, said flange portion being configured to accomplish mounting of the motor.

7. The rotor assembly according to claim 6, wherein said lid portion and said flange portion are formed as an integral element.

8. The rotor assembly according to claim 6, wherein said lid portion is made of plastic, wherein said flange portion is made of one of a plastic material and a metal material, and wherein said flange portion is connected to said lid portion.

9. The rotor assembly according to claim 1, wherein said bearing mounting member further comprises a lid portion terminating said sleeve at said first end face and enclosing said first bearing, and wherein said flange further comprises a casing portion connected to said lid portion and enclosing said motor.

10. The rotor assembly according to claim 9, wherein said lid portion is made of plastic, and said casing portion is made of metal and molded into said lid portion.

11. The rotor assembly according to claim 10, wherein said casing portion is made of a deep-drawn metal sheet and is injection-coated by said plastic lid portion joining said lid portion with said casing portion.

12. An inner-rotor d.c. motor comprising:
a rotor assembly, said rotor assembly further comprising
a rotor shaft having at least one permanent magnet mounted thereon;
a sleeve accommodating said rotor shaft with said permanent magnet therewithin for a free rotation of said rotor shaft, said sleeve being open at both ends;
a first bearing supporting said shaft;
a second bearing supporting said shaft; and
a flange, said flange further comprising a bearing mounting member extending towards the interior of said rotor assembly and connecting said flange to said sleeve at a first end face of said sleeve by sliding said first end of said sleeve over said bearing mounting member, and
a stator,
wherein said first bearing is integrated into said bearing mounting member at said first end face of said sleeve such that said first bearing is not placed into contact with said sleeve, wherein said second bearing is integrated into said sleeve at a second end face of said sleeve such that said second bearing is placed into an immediate contact with said sleeve, wherein said first and second end faces of said sleeve are enclosed by said flange and said first and second bearings, and wherein said stator is inserted over said sleeve of said rotor assembly.

13. The inner-rotor d.c. motor according to claim 12, wherein said bearing mounting member of said flange further comprises a lid portion and said flange further comprises a casing portion, and wherein said stator is inserted between said sleeve and said casing portion of said rotor assembly.

14. The inner-rotor d.c. motor according to claim 12, wherein said rotor assembly further comprises a stiffening structure on the outside of said sleeve, and wherein an outer contour of said stiffening structure is adapted to an inner contour of said stator.

15. The inner-rotor d.c. motor according to claim 12, wherein said motor is resin-embedded.

16. The rotor assembly according to claim 1, wherein said bearing mounting member and said flange are formed as an integral element.

17. The inner-rotor d.c. motor according to claim 12, wherein said bearing mounting member and said flange are formed as an integral element.

* * * * *